(12) United States Patent
Hidalgo

(10) Patent No.: US 9,402,016 B1
(45) Date of Patent: Jul. 26, 2016

(54) ELECTRONIC DEVICE MOUNT

(71) Applicant: Miguel Alejandro Hidalgo, Coral Gables, FL (US)

(72) Inventor: Miguel Alejandro Hidalgo, Coral Gables, FL (US)

(*) Notice: Subject to any disclaimer, the term of this patent is extended or adjusted under 35 U.S.C. 154(b) by 0 days.

(21) Appl. No.: 14/248,967

(22) Filed: Apr. 9, 2014

(51) Int. Cl.
*H04N 5/225* (2006.01)
*B62J 11/00* (2006.01)

(52) U.S. Cl.
CPC ............. *H04N 5/2251* (2013.01); *B62J 11/00* (2013.01)

(58) Field of Classification Search
CPC . H04N 5/2352; H04N 5/3532; H04N 5/2353; H04N 5/3454
See application file for complete search history.

(56) References Cited

U.S. PATENT DOCUMENTS

| | | | |
|---|---|---|---|
| 6,557,437 B2 | 5/2003 | Masui et al. | |
| 7,422,379 B2 | 9/2008 | Agevik et al. | |
| 8,128,295 B2 | 3/2012 | Pizzo et al. | |
| 8,246,001 B2 | 8/2012 | Huang | |
| 8,382,059 B2 | 2/2013 | Le Gette et al. | |
| 8,531,834 B2 | 9/2013 | Rayner | |
| 2008/0179478 A1* | 7/2008 | Lee | 248/276.1 |
| 2011/0248060 A1 | 10/2011 | Luk et al. | |
| 2013/0181584 A1 | 7/2013 | Whitten et al. | |
| 2013/0288743 A1 | 10/2013 | Hunt et al. | |
| 2013/0329115 A1* | 12/2013 | Palmeri | 348/335 |
| 2013/0334072 A1 | 12/2013 | Rayner | |
| 2014/0171150 A1* | 6/2014 | Hurst et al. | 455/556.1 |
| 2015/0038200 A1* | 2/2015 | Kennard | A45C 11/00 455/575.8 |

FOREIGN PATENT DOCUMENTS

DE 20319228 U1 3/2004

OTHER PUBLICATIONS iBike Dash for iPhone 5, Salient Technologies, published Dec. 13, 2012, https://www.youtube.com/watch?v=BSS2TjxRkkE.*

* cited by examiner

*Primary Examiner* — Twyler Haskins
*Assistant Examiner* — Angel L Garces-Rivera
(74) *Attorney, Agent, or Firm* — Albert Bordas, P.A.

(57) ABSTRACT

An electronic device that mounts onto a bicycle frame or handlebar to permit video recording with a smart phone while riding. The present electronic device mount includes a housing assembly having a lateral door to receive the smart phone therethrough. The housing assembly has a front window to permit viewing of the smart phone's screen, and an opening on a rear wall that is cooperatively positioned to coincide with the smart phone's video camera. The rear opening has a mirror housing with an interior mirror disposed at a predetermined angle to redirect the video recording from the smart phone to capture the route of the rider. A swivel mechanism connects the housing assembly with the mounting assembly to permit the user to adjust a position of the housing assembly according to the view the user wants to see on the screen of the phone.

4 Claims, 16 Drawing Sheets

ELECTRONIC DEVICE MOUNT

BACKGROUND OF THE INVENTION

1. Field of the Invention

The present invention relates to electronic devices, and more particularly, to an electronic device mount to be used with bicycles or motorcycles.

2. Description of the Related Art

Applicant believes that one of the closest references corresponds to U.S. Patent Application Publication No. 20130334072 A1, published on Dec. 19, 2013 to Rayner for Housing for Encasing a Tablet Computer. However, it differs from the present invention because Rayner teaches an apparatus and a system for housing a device. The apparatus includes a housing that is configured such that a device may be fitted within the housing and thereby be protected, such as from shocks and/or liquid. The housing may include top and bottom members that may be removably coupled together so as to form the housing. Each top and bottom member includes a perimeter portion. The perimeter is defined by proximal and distal ends as well as opposing sides. The top and bottom members may include respective clasping mechanisms that extend along the perimeter of the top and bottom members and may be configured for engaging a third clasping mechanism, such as a locking comb or wedge feature. The clasping mechanisms are configured for coupling the top and bottom members with one another thereby sealing the housing, for instance, in a shock-proof and/or watertight seal.

Applicant believes that another reference corresponds to U.S. Patent Application Publication No. 20130288743 A1, published on Oct. 31, 2013 to Hunt, et al. for Mounting System for Attaching Mobile Devices to Sports Equipment. However, it differs from the present invention because Hunt, et al. teaches a mounting system for attaching a mobile device having a mobile device camera and an interface to sports equipment during use of such sports equipment. The mounting system includes a cradle adapted to retain the mobile device without obstructing operation of the mobile device camera or interfering with access to the interface. A pivoting joint attaches the cradle to an extension arm that permits the cradle to be moved in pitch, yaw, and roll relative to the extension arm. One or more mounting structures are provided to pivotally attach the extension arm to the sports equipment so that the interface is oriented toward and accessible by a user of the sports equipment, and the mobile device camera is oriented to capture user's perspective during use of the sports equipment. At least one sport-specific software application is loaded on the mobile device.

Applicant believes that another reference corresponds to U.S. Patent Application Publication No. 20130181584 A1, published on Jul. 18, 2013 to Whitten, et al. for Case and Mount System for Handheld Electronic Device. However, it differs from the present invention because Whitten, et al. teaches a protective case for a handheld electronic device. The protective case can include a removable mounting system comprised of an interlocking member and a plurality of mounting bases. The protective case may further include a non-slip member to prevent the device from slipping on a surface and a magnet for attaching the device to a magnetic surface.

Applicant believes that another reference corresponds to U.S. Patent Application Publication No. 20110248060 A1, published on Oct. 13, 2011 to Luk, et al. for Rotatable Mobile Device Holder for a Motor Vehicle Sun Visor. However, it differs from the present invention because Luk, et al. teaches a protective holder for a mobile device including attaching portions for mounting to a motor vehicle sun visor. The attaching portions include clips, elastic straps, Velcro fasteners, double-sided sticking tape strips or hooks. The holder includes a main opening for the mobile device with adjoining sides. The adjoining sides include additional openings to provide access to the power switch, power charging jack, speaker, memory card, camera, flash, microphone, keypad, volume adjust, headphone jack, HDMI video jack, LCD or image touch screen. A rotating mechanism may be used for swiveling the mobile device from portrait or landscape positions and vice-versa while it is inserted in the holder. The mobile device can be a cell phone or a smartphone that can serve as a portable GPS navigation device. Applicant believes that another reference corresponds to U.S. Pat. No. 8,531,834 B2 issued to Rayner on Sep. 10, 2013 for Housing for Encasing a Tablet Computer. However, it differs from the present invention because Rayner teaches an apparatus and/or system for housing a device including a housing configured such that a device may be fitted within the housing and thereby be protected, such as from shocks and/or liquid. The housing may include top and bottom members that may be removably coupled together so as to form the housing. Each top and bottom member includes a perimeter portion. Defined by proximal and distal ends as well as opposing sides. The top and bottom members may include respective clasping mechanisms that extend along the perimeter of the top and bottom members and may be configured for engaging a third clasping mechanism, such as a locking comb or wedge feature. The clasping mechanisms are configured for coupling the top and bottom members with one another thereby sealing the housing, for instance, in a shockproof and/or watertight seal.

Applicant believes that another reference corresponds to U.S. Pat. No. 8,382,059 B2 issued to Le Gette, et al. on Feb. 26, 2013 for Holder for Electronic Device with Support. However, it differs from the present invention because Le Gette, et al. teaches a protective holder for the iPhone®, iPad®, iPod Touch™, electronic books, electronic tablet computers and other portable devices having a frontal LCD, OLED, touch screen, or other display that employs a form-fitting backplate with corner frames for cradling the device while leaving the entire frontal aspect unobstructed. The holder may include a series of contoured side grippers on each side of the backplate for clamping the device in place without obstructing the LCD screen (or access to it for cleaning or otherwise). The holder may include a fully-adjustable kickstand for upright hands-free viewing of the device at several landscape and portrait angles and the holder may also include a built-in moveable directional sound reflector and noise shield improves audio performance, and a detachable belt clip allows belt wearing. The holder has an extreme slimline folded profile to facilitate pocket insertion, minimize bulk and create an eye-catching aesthetic.

Applicant believes that another reference corresponds to U.S. Pat. No. 8,246,001 B2 issued to Huang on Aug. 21, 2012 for Portable Electronic Device with Supporting Member. However, it differs from the present invention because Huang teaches a portable electronic device. The portable electronic device includes a main body and a supporting member rotatably connected to the main body. The main body defines a chamber for receiving detachable elements of the portable electronic device therein. The supporting member includes a number of supporting sheets, which can be folded or unfolded relatively to each other. The folded supporting member is configured for covering the chamber of the main body, and the unfolded supporting member is configured for supporting the main body.

Applicant believes that another reference corresponds to U.S. Pat. No. 8,128,295 B2 issued to Pizzo, et al. on Mar. 6, 2012 for Hand Held Camera Mount. However, it differs from the present invention because Pizzo, et al. teaches a hand held camera unit comprising a shoulder assembly and a platform assembly for releasably holding a camera. A connector is provided between the shoulder assembly and the platform assembly, and is movable between a locked position wherein the platform assembly is fixed relative to the shoulder assembly and an unlocked position wherein the platform assembly can be selectively moved relative to the shoulder assembly in the roll axis, the yaw axis and in a fore and aft direction.

Applicant believes that another reference corresponds to U.S. Pat. No. 7,422,379 B2 issued to Agevik, et al. on Sep. 9, 2008 for Stand for a Camera Device. However, it differs from the present invention because Agevik, et al. teaches a stand for a camera device, the stand comprising an attachment element, which is detachably fastened to the camera device and at least one support element which is displaceably connected to the attachment element. The support element is displaceable between at least two positions, a "storage" position where the at least one support element essentially lies up against an outer surface of the camera device and an "active" position where the at least one support element is displaced away from the outer surface of the camera device in order to provide a support for supporting the camera device in a steady orientation on a surface. The attachment element and the supporting element are furthermore arranged such that the attachment element remains fastened to the camera device during the displacement of the supporting element between its storage position and its active position. In this way, a stand is provided for the user to use.

Applicant believes that another reference corresponds to U.S. Pat. No. 6,557,437 B2 issued to Masui, et al. on May 6, 2003 for Handlebar Adapter for Mounting a Bicycle Display. However, it differs from the present invention because Masui, et al. teaches a device for mounting a bicycle display to a steering member of a bicycle including a mounting arch. A display coupler is disposed on the mounting arch. A first mounting section with a first mounting surface is disposed at a first end of the mounting arch. The first mounting section includes an opening that receives a fastener. A second mounting section is disposed at a second end of the mounting arch. The second mounting section includes a second mounting surface that does not face the first mounting surface.

Applicant believes that another reference corresponds to DE Patent No. 20319228 U1 issued to Hochschorner Gmbh on Mar. 4, 2004 for Camera for Cycles and Leisure Equipment Use Has Miniature CCD Camera on Adjustable Bracket with Image Memory and External Infrared Interface. However, it differs from the present invention because Hochschorner Gmbh teaches a camera (10) comprising a miniature CCD (Charge Coupled Device) camera (12) with adjustable (34, 36) bicycle handlebar (14) bracket (32) or attachment to other leisure equipment or a multifunction wristwatch using hook, clip, hook and loop, clamp knob or, and has an image memory with an external infrared interface to PC or mobile phone and capacity display (38).

Other patents describing the closest subject matter provide for a number of more or less complicated features that fail to solve the problem in an efficient and economical way. None of these patents suggest the novel features of the present invention.

SUMMARY OF THE INVENTION

In one embodiment, the present invention is an electronic device mount assembly, comprising:

a housing assembly including an image capture cavity configured for receiving propagated light onto an image capture device contained in said housing assembly;

a mirror assembly configured with at least one mirror or reflective material positioned to propagate light from outside said mirror assembly through image capture cavity and ultimately to said image capture device;

a mechanism configured to move said housing assembly; and a mounting assembly configured to mount said electronic device.

In one embodiment, the invention further comprises a device holding assembly. The device holding assembly is constructed and arranged to nest within the housing assembly.

The device holding assembly is constructed and arranged to hold a device having at least one image capture element operatively associated therewith. The image capture element is a camera or camera-like apparatus. The image capture element is operatively associated therewith is any one of a camera, cell phone, smart phone, tablet computer, or other electronic article including at least one image capture element, for example, a smart phone with an incorporated camera.

The mechanism configured to move said housing assembly is constructed to selectively move said housing assembly along any of an x-axis, y-axis, z-axis, or combinations thereof.

In one embodiment, mechanism configured to move said housing assembly is a swivel assembly that rotationally moves and positions the housing assembly The mirror assembly is configured with either an angular or curvature relative to a bottom face of said housing assembly. The mirror assembly is configured with an opening for allowing light to pass onto said mirror or reflective surface. As generally understood, references herein to light passing and/or propagating include the visual perception of images reflected onto the mirror or reflective surface and into the image capture element.

In one embodiment, the mounting assembly is configured with a mounting base constructed and arranged for mounting on a handlebar.

In one embodiment, the housing assembly is permanently attached to said mounting assembly.

In one embodiment, the housing assembly is permanently attached housing assembly is removably attached to said mounting assembly.

The present invention also contemplates a method for capturing video images, said method comprising the steps of:

providing a device according to the invention described herein;

providing a device having at least one image capture element;

positioning said device having at least one image capture element in said housing assembly;

actuating said image capture element.

It is therefore one of the main objects of the present invention to provide an electronic device mount.

It is another object of this invention to provide an electronic device mount that mounts onto a bicycle frame or handlebar to permit video recording with a smart phone while riding.

It is another object of this invention to provide an electronic device mount comprising a housing assembly, a mirror assembly, a swivel mechanism, and a mounting assembly.

It is another object of this invention to provide an electronic device mount, which housing assembly has a front wall with front window to permit the user viewing of the smart phone's screen therethrough.

It is another object of this invention to provide an electronic device mount, which mirror assembly comprises an interior mirror disposed at a predetermined angle to redirects the video recording from the smart phone to capture the route of the rider.

It is another object of this invention to provide an electronic device mount that is volumetrically efficient for carrying, transporting, and storage.

It is another object of this invention to provide an electronic device mount that can be readily assembled and disassembled without the need of any special tools.

It is another object of this invention to provide an electronic device mount, which is of a durable and reliable construction.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
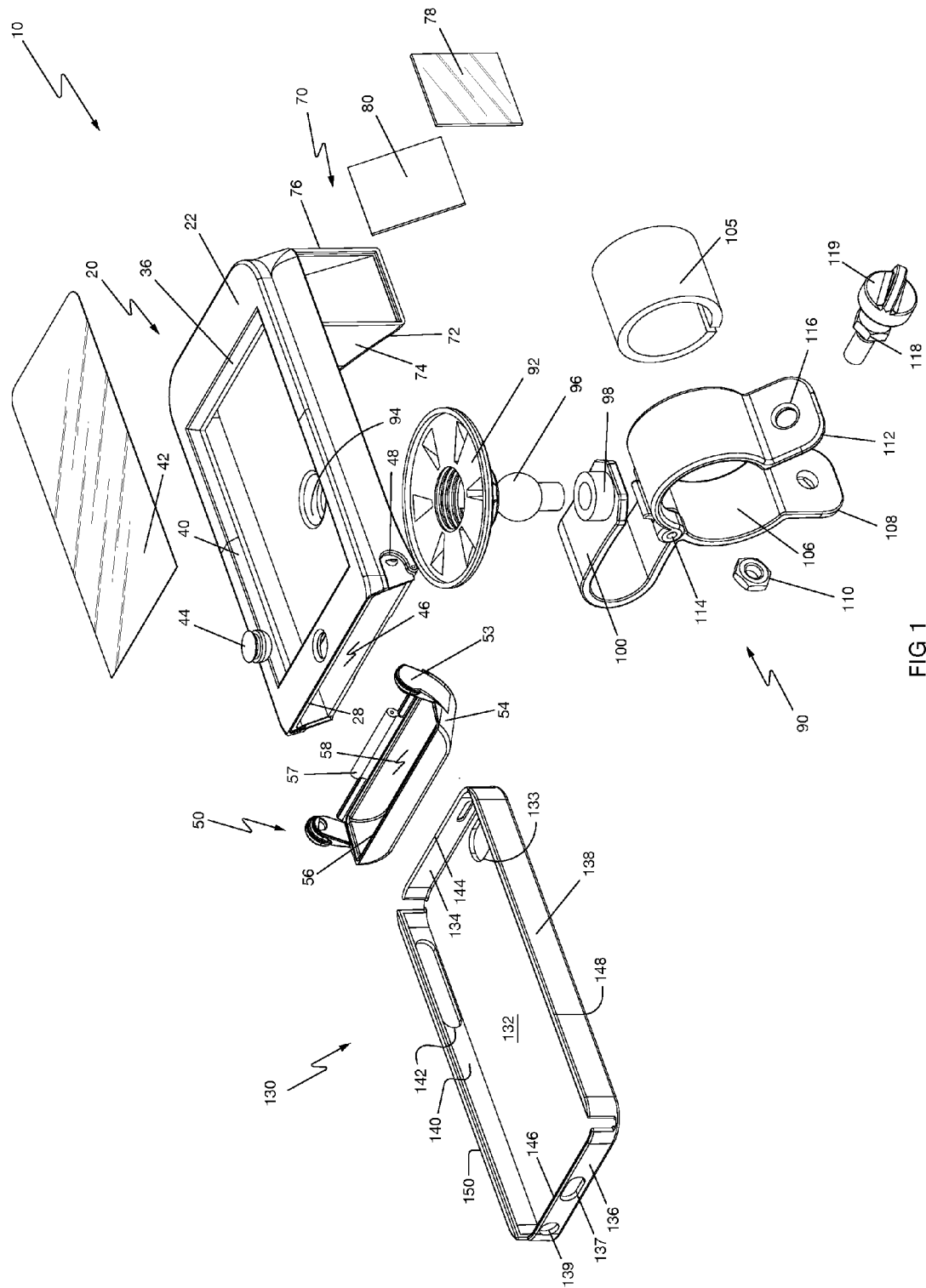
FIG. 1 represents an isometric view of an electronic device mount components in a separated view original embodiment of the present invention.
Figure 2:
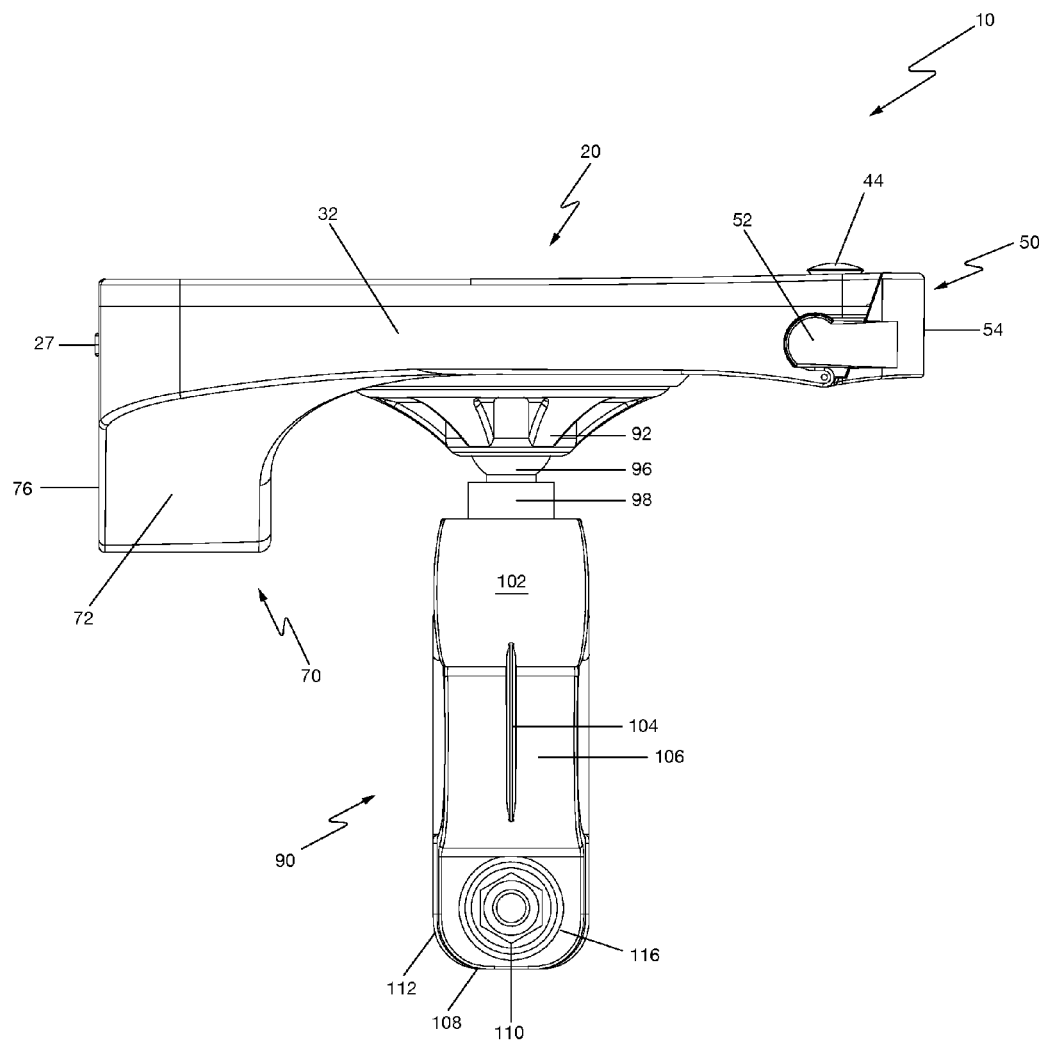
FIG. 2 is a rear view of one embodiment of the device of the present invention.
Figure 3:
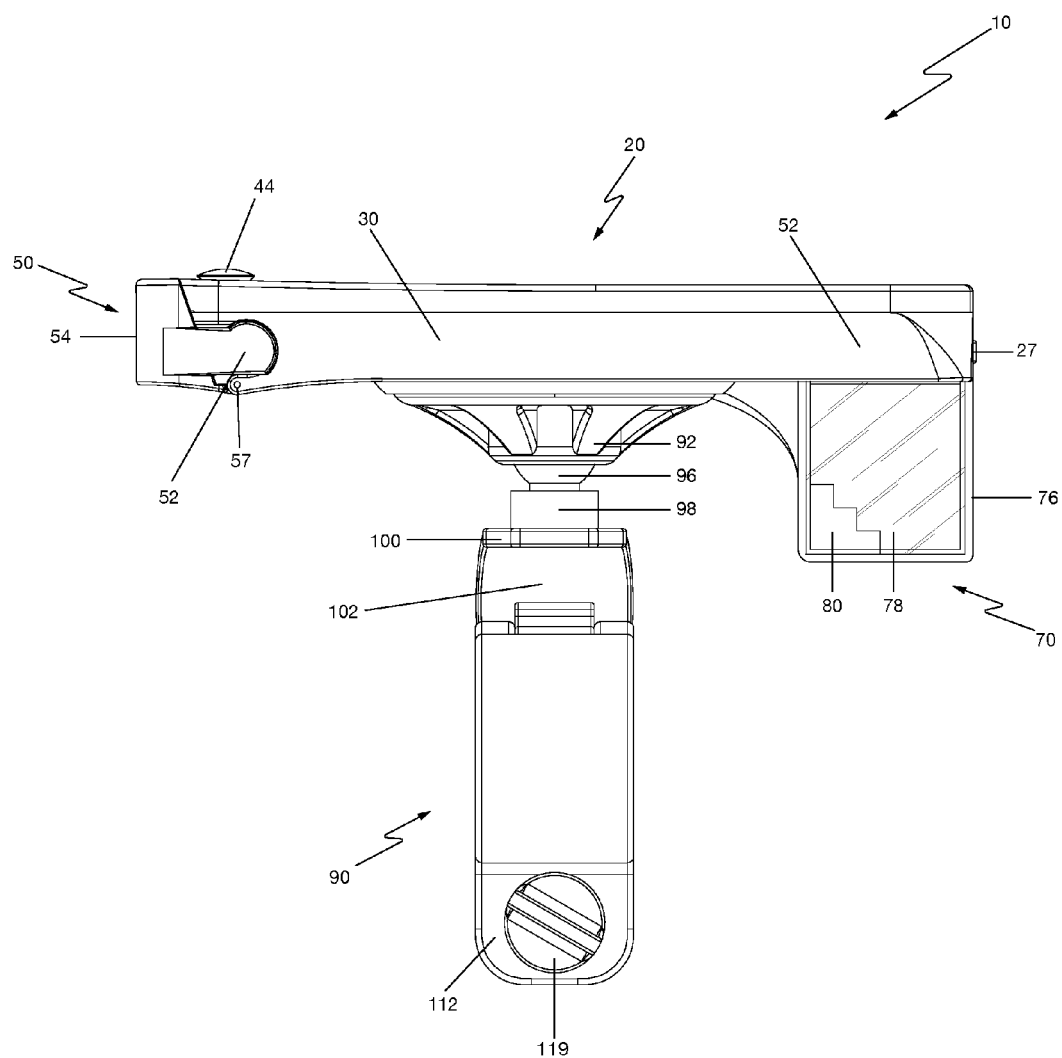
FIG. 3 is a front view of one embodiment of the device the present invention.
Figure 4:
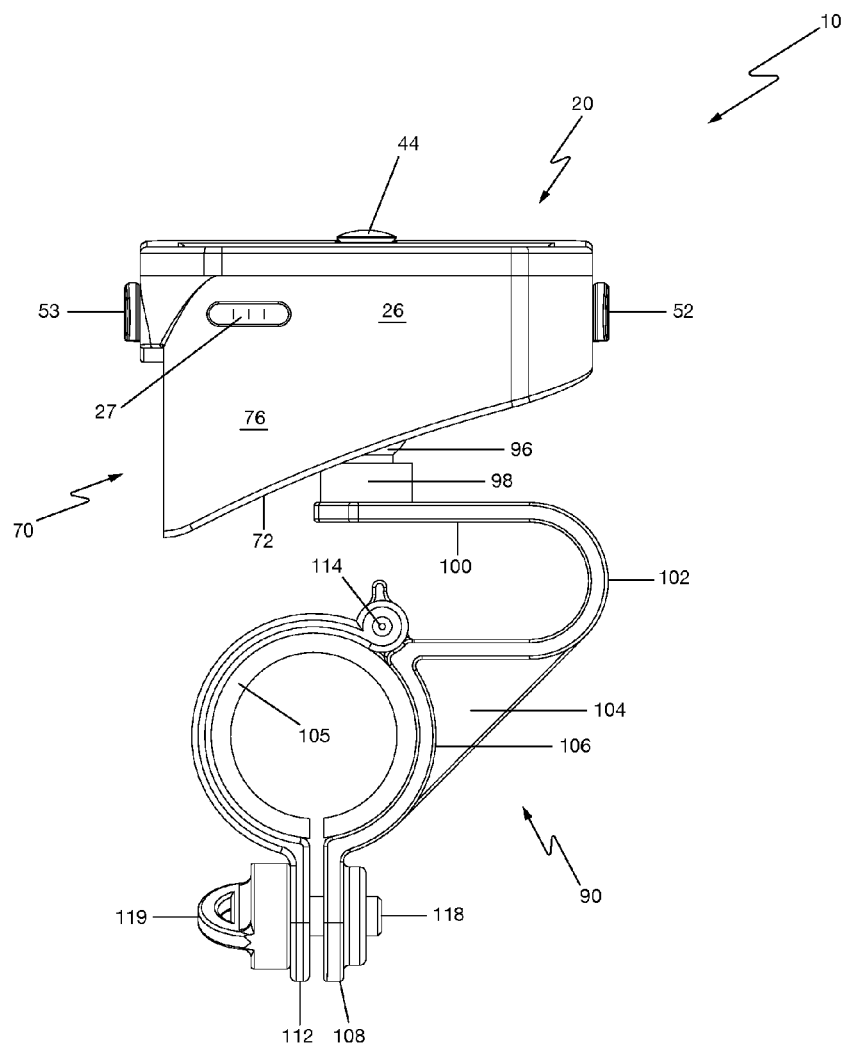
FIG. 4 is a side view of one embodiment of the device of the present invention.
Figure 5:
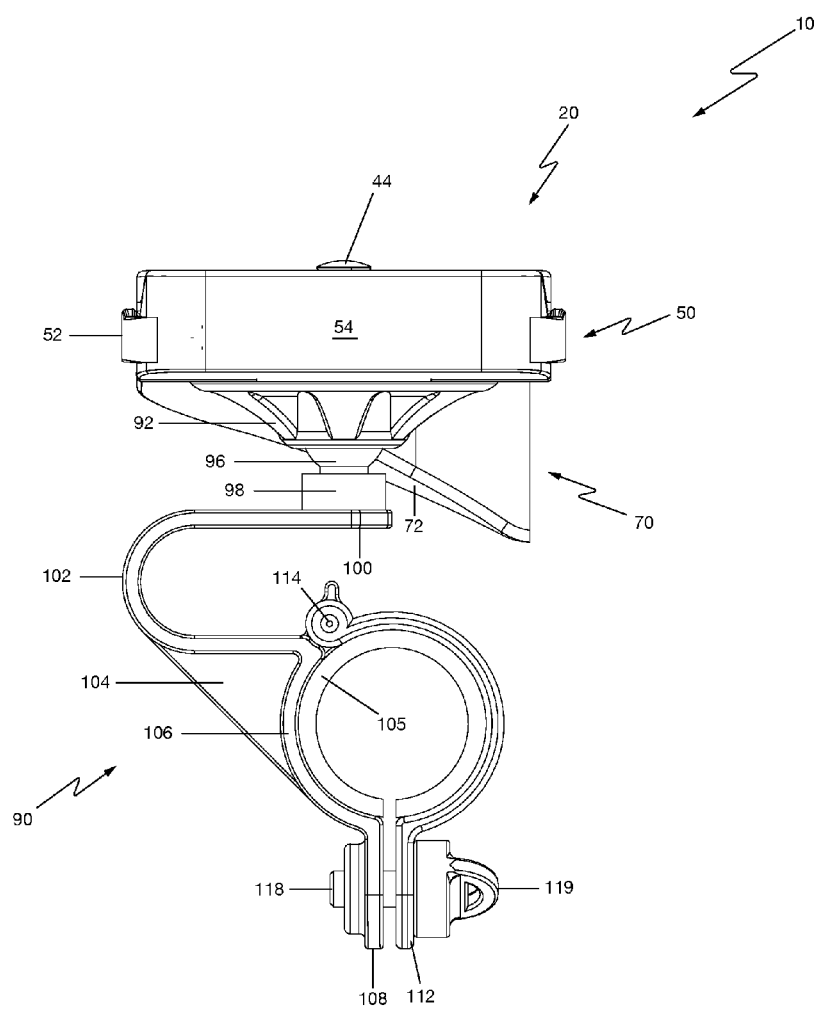
FIG. 5 is a side view of one embodiment of the device of the present invention.
Figure 6:
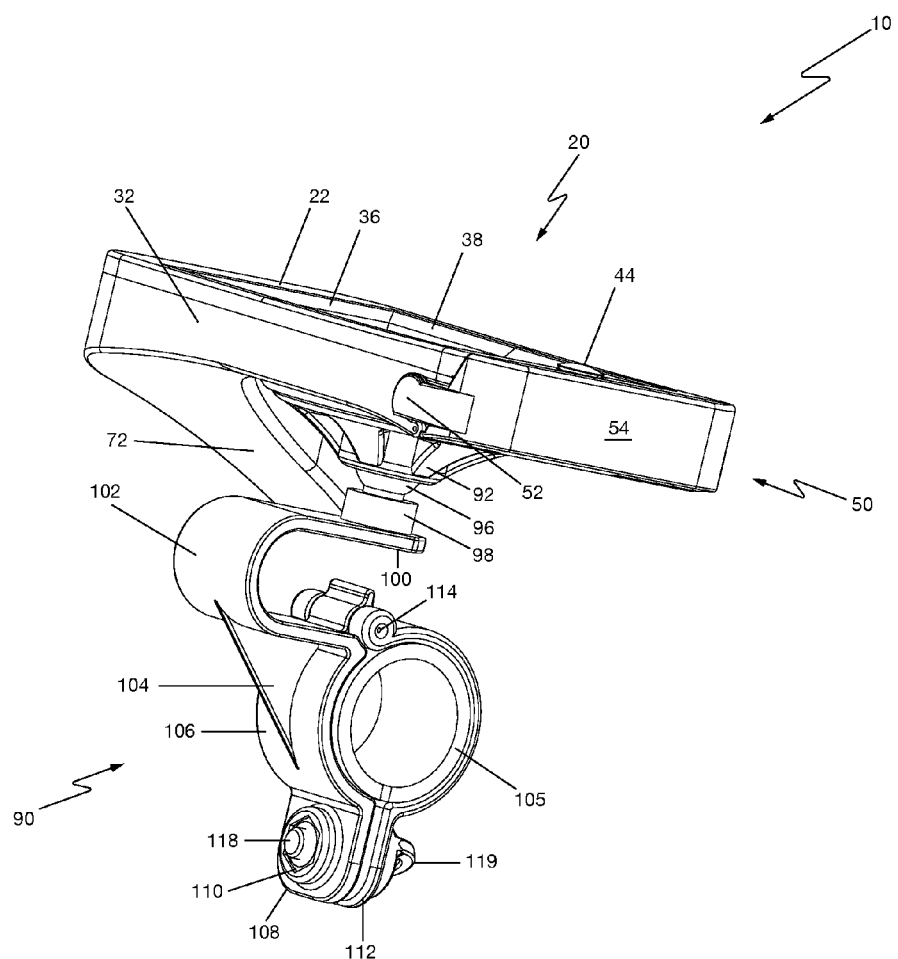
FIG. 6 is a perspective view of the assembled components of one embodiment of the device of the present invention.
Figure 7:
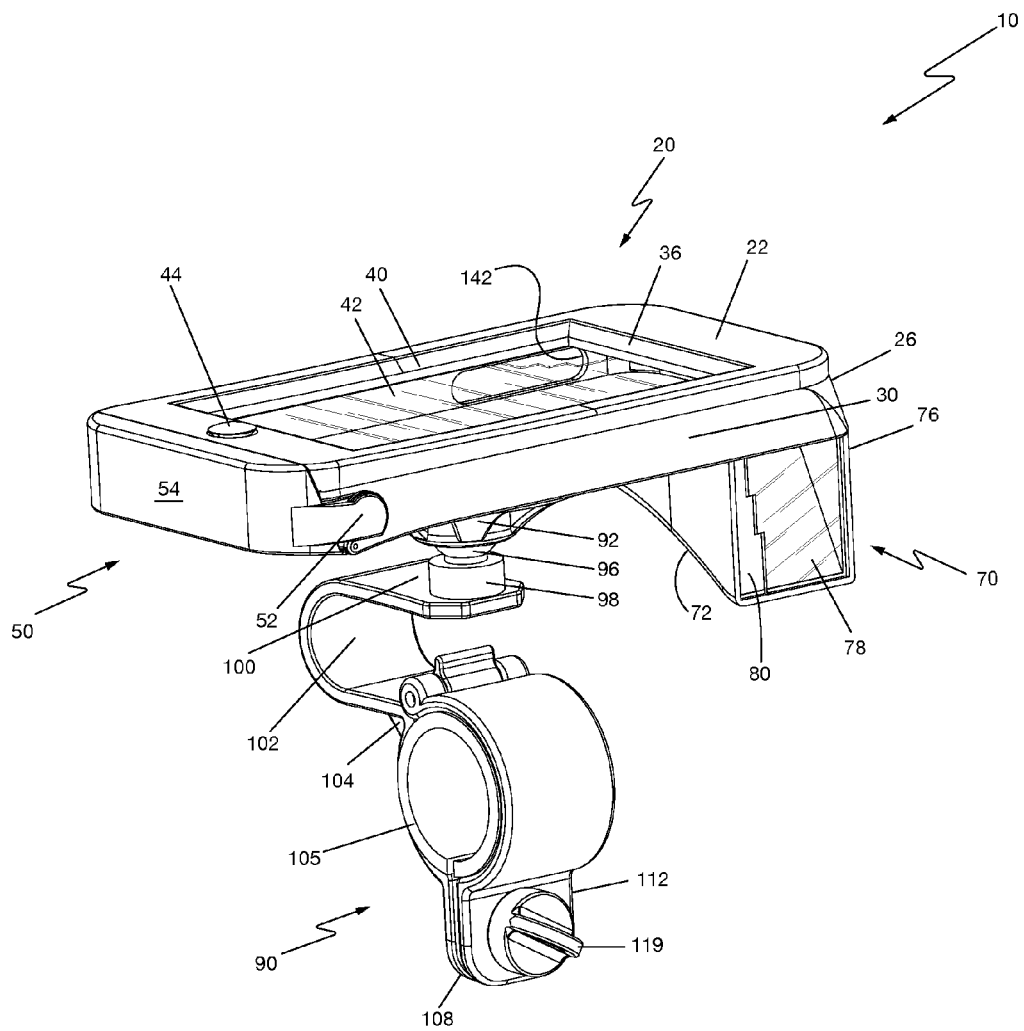
FIG. 7 is a perspective view of the assembled components of one embodiment of the device of the present invention.
Figure 8:
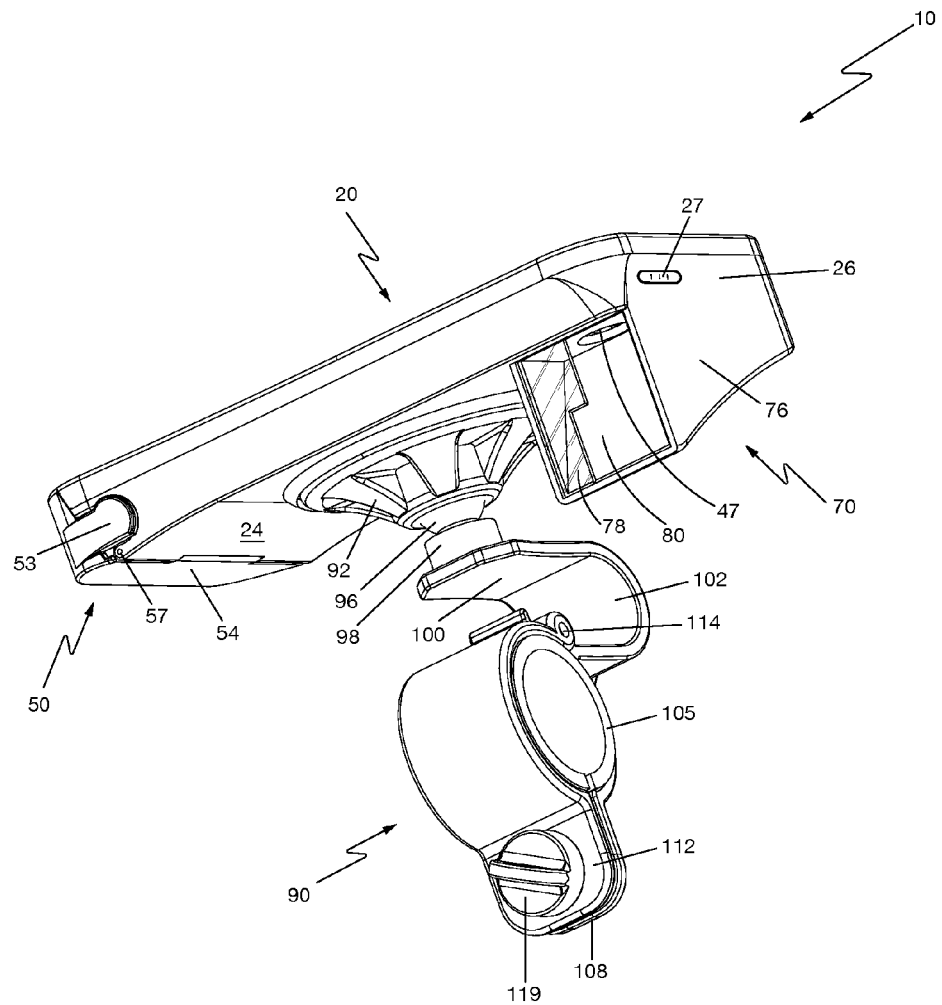
FIG. 8 is a perspective view from below the planer surface of the housing of one embodiment of the device of the present invention.
Figure 9:
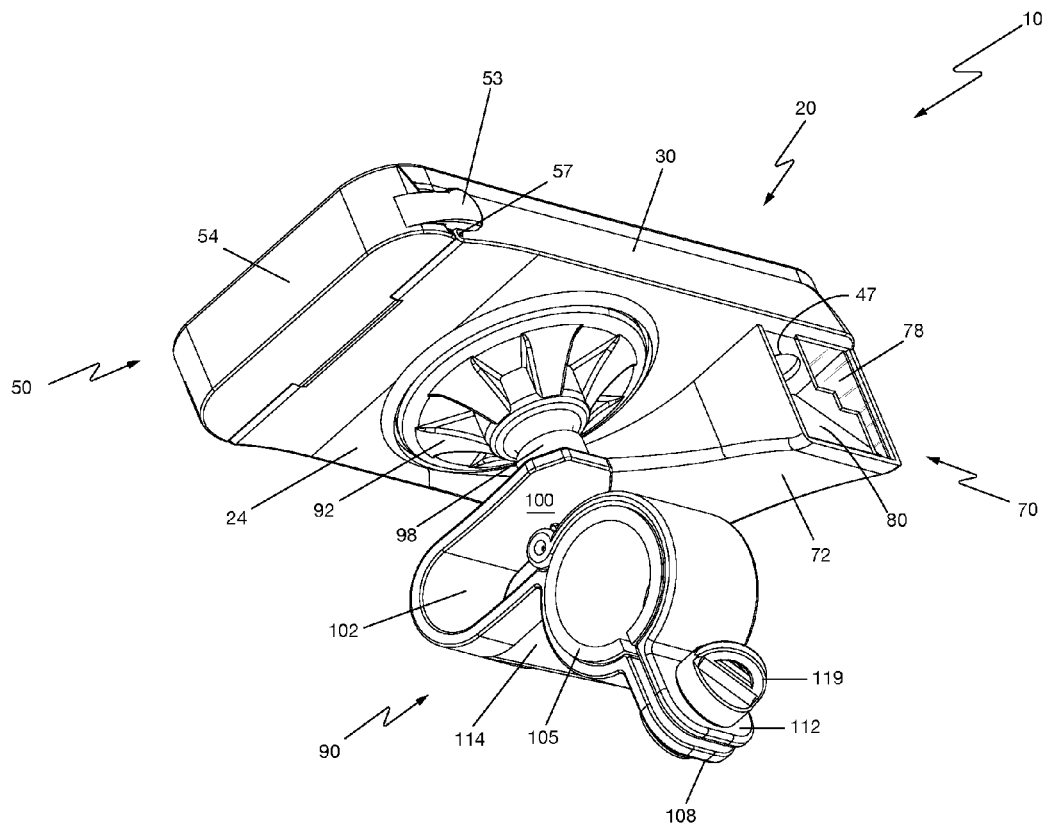
FIG. 9 is a perspective view from below the planer surface of the housing of one embodiment of the device of the present invention.
Figure 10:
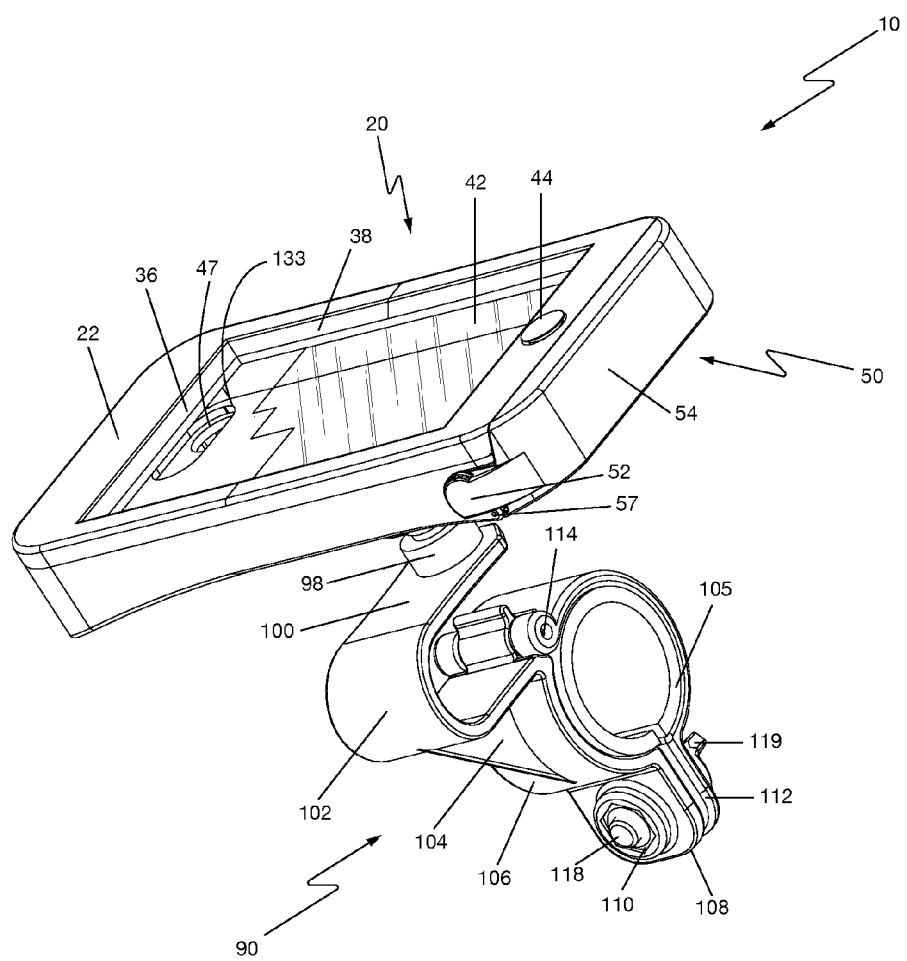
FIG. 10 is a perspective view from above the planer surface of the housing of one embodiment of the device of the present invention.
Figure 11:
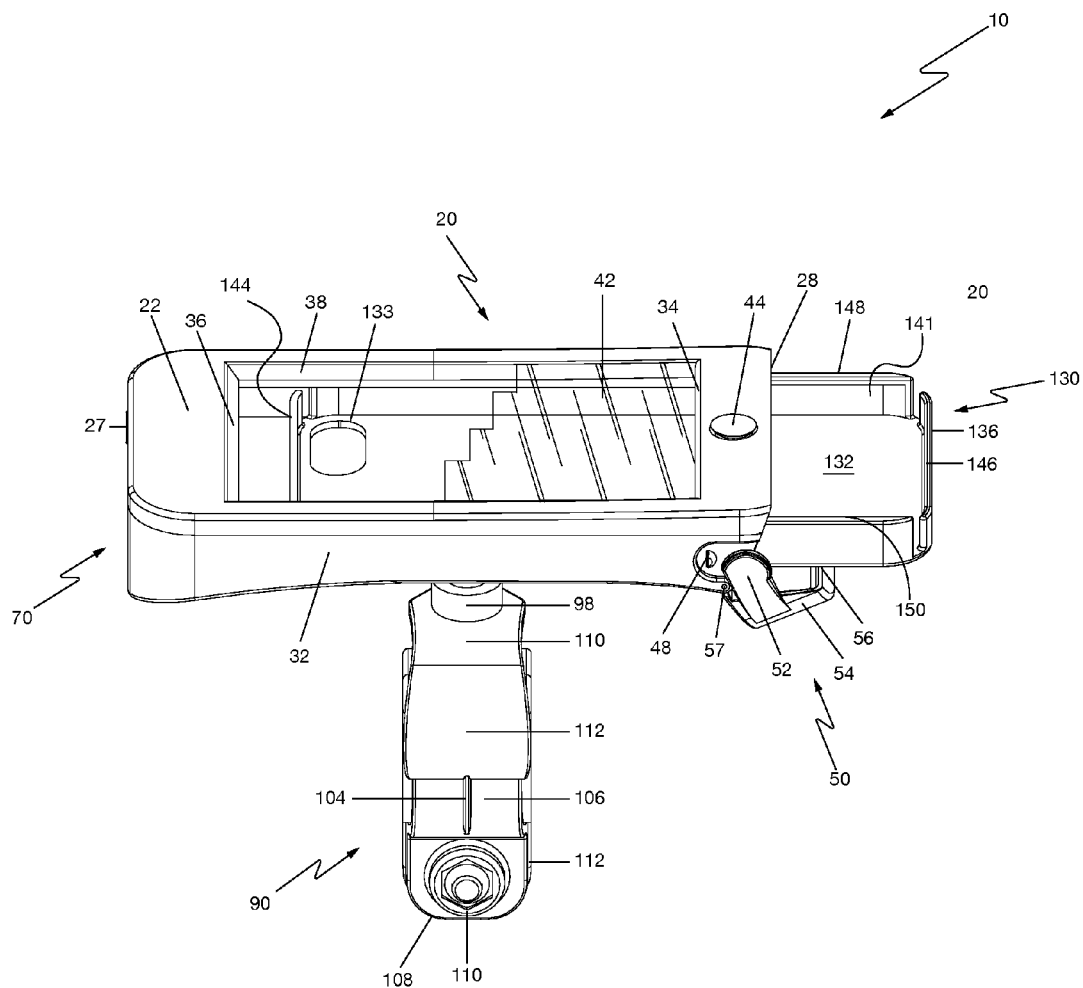
FIG. 11 is a front perspective view from above the planer surface of the housing of one embodiment of the device of the present invention.
Figure 12:
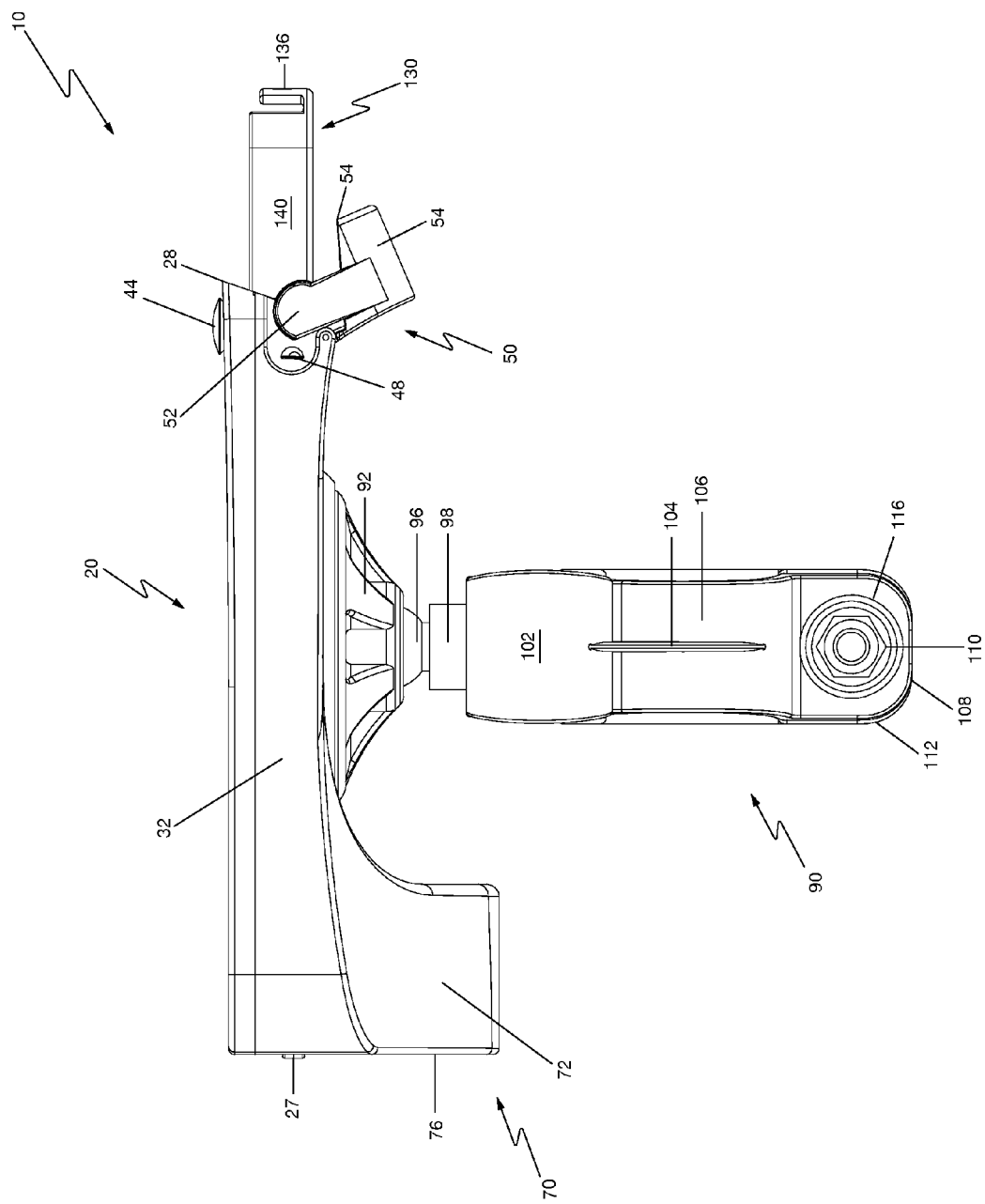
FIG. 12 is a rear view of preassembled components of one embodiment of the present invention.
Figure 13:
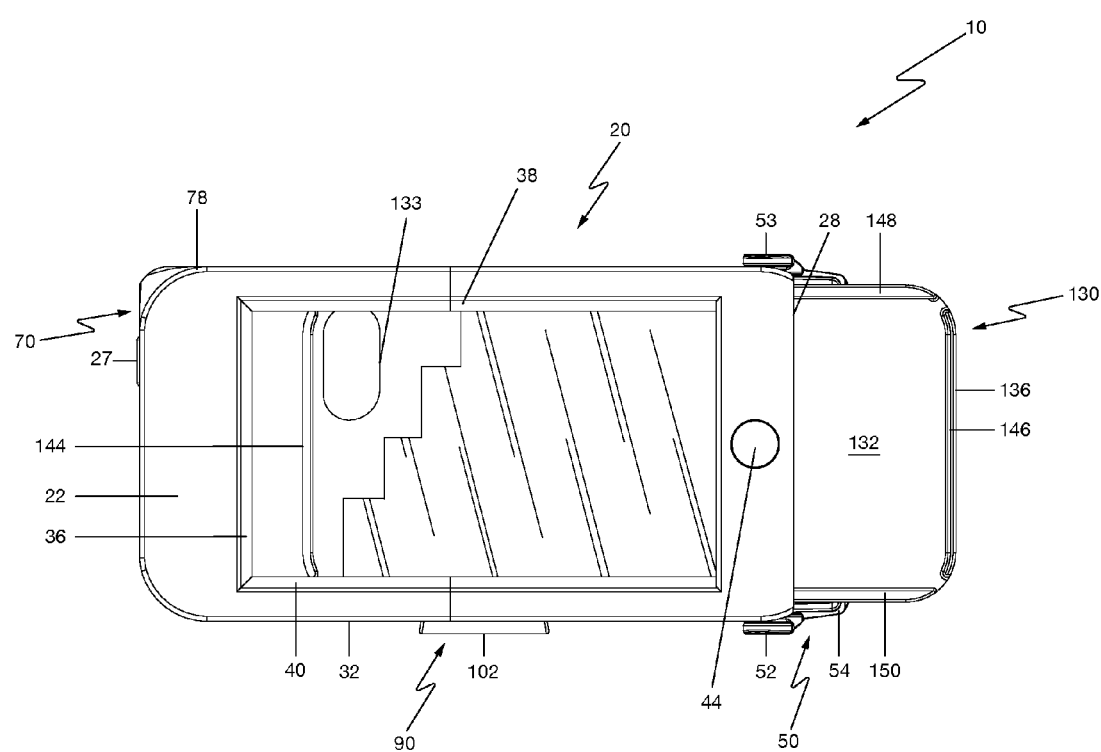
FIG. 13 is a top view of one embodiment of the present invention.
Figure 14:
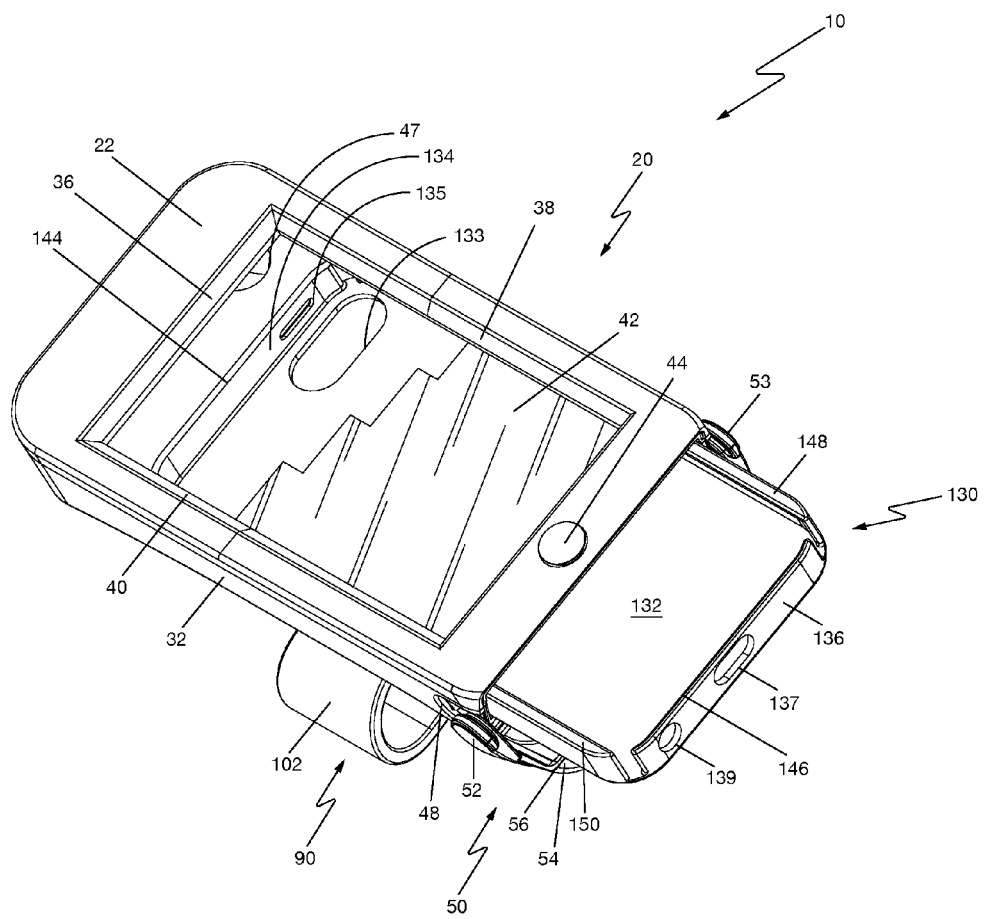
FIG. 14 is a top perspective view of one embodiment of the present invention

Referring now to the drawings, the present invention is generally referred to with numeral 10. It can be observed that it basically includes housing assembly 20, mirror assembly 70, swivel mechanism 60, and mounting assembly 90.

Figure 15:
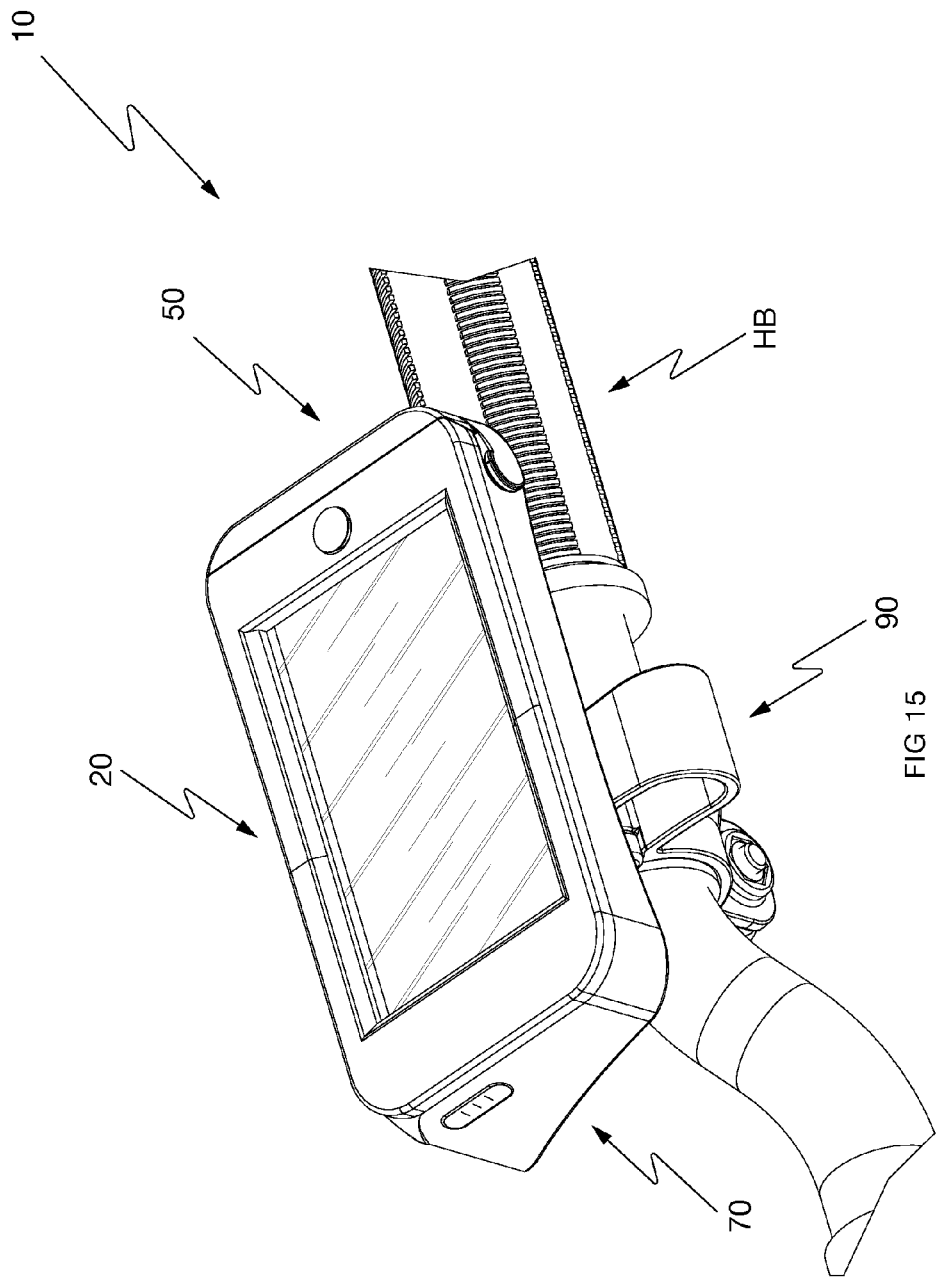
FIG. 15 is a perspective view demonstrative of environment of use of one embodiment according the present invention.
Figure 16:
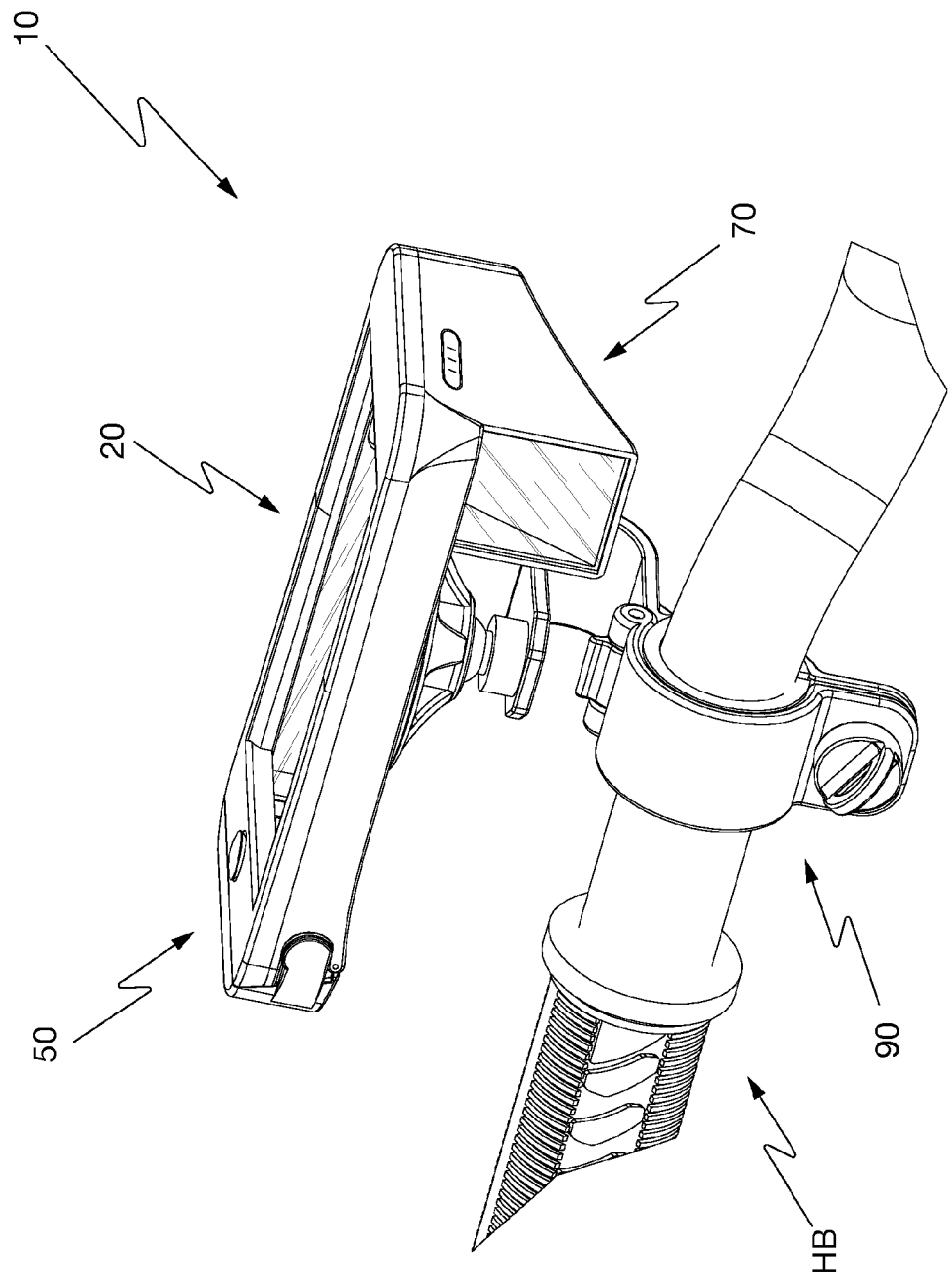
FIG. 16 is a perspective view demonstrative of environment of use of one embodiment according the present invention.

As seen in FIGS. 1, 15, and 16, electronic device mount 10 mounts onto a bicycle frame or handlebar HB to permit video recording with a smart phone while riding.

As seen in FIGS. 2 through 14, housing assembly 20 is formed of a top face 22, bottom face 24, lateral face 26, and first edge 28. An interior cavity of assembly 20 is bordered by first interior edge 34, second interior edge 36, third interior edge 38, and fourth interior edge 40. In one embodiment, a transparent film screen 42 is positioned within the periphery of each of the mentioned first through fourth interior edges that simultaneously protect a device placed within assembly 20 and provides for viewing of a device screen.

In one embodiment, actuator extending button 44 is positioned on housing assembly 20 and is constructed and arranged to interact with an electronic device actuator when electronic device is positioned within housing assembly 20. By way of example, the well-known home screen button on an iPhone can be actuated by depressing actuator extending button 44 downward onto the native iPhone home screen button such that actuator extending button 44 contacts iPhone home screen button and actuates the iPhone device. Housing assembly 20 further encompasses a receiving cavity 46 constructed and arranged to receive case assembly 130 therein. Further contemplated is lens cavity 47 constructed and arranged to provide a light pathway to an electronic device photographic and or video lens whereby said light pathway includes a pathway of light and or images direct in from mirror housing assembly 70.

In one embodiment, assembly 10 includes an access door assembly 50 including a door arm 53 constructed and arranged to interact with a door arm receiver 48 whereby said access door assembly 50 is pivotably connected to housing assembly 20 at pivot assembly 57. Door assembly 50 in one embodiment, includes a door cavity 58 and door edge 56. Door cavity 58 is constructed and arranged to contain at least a portion of case assembly 130 when case assembly 130 is positioned within housing assembly 20.

Housing assembly 20 further includes mirror housing assembly 70, formed of a first side portion 74, a second side portion 74, and a bottom portion 72. Mirror housing assembly 70 is constructed and arranged to position mirror 80 therein. The position of mirror 80 is either angular, curved, or combinations thereof relative to bottom face 24 of housing assembly 20. In one embodiment, lens 78 is positioned on or proximate to mirror 80. As generally understood by the configuration presented in the figures, light passes into mirror housing assembly 70, is reflected onto mirror 80 and reflected light is propagated through lens cavity 47 and captured by and image capture device positioned and contained within housing assembly 20.

Assembly 10 further includes mounting assembly 90 that is formed of mounting base 92, support 96, and support mount 98. In one embodiment, support 96 is constructed and arranged to provide a ball/swivel movement as is known and demonstrated in the accompanying figures.

Assembly at 10 further includes a support arm 100. In one embodiment, support arm 100 has a curved portion 102 and disconnected to a mounting base 106 at mounting assembly hinge 114. Mounting base 106 includes, in one embodiment, internal mounting base support 105. Mounting assembly 90 additionally encompasses a pair of screw receiving cavities 116 arranged in opposition one to another providing for insertion of screw 118 therethrough whereby screw 118 will contact screw securing nut 120 when screw 118 is tightened by rotational attachment imparted by rotating screw head 119. As demonstrated in FIG. 10, mounting assembly 90 includes reinforcing support brace 104 that provides structural support to support arm 100 by providing a structure in contact between support arm 100 and mounting base 106. Mounting assembly 90 additionally encompasses a first end 108 and second end 112 dependent on mounting base 106 and are joined when screw 118 is attached to mounting base 106 through screw receiving cavities 116.

Assembly 20 additionally includes case assembly 130 whereby case assembly 130 is formed of a first wall 134, the second wall 136, a third wall 138, and a fourth wall 140. Each respective wall terminates at an upper edge respectively first upper edge 144, second upper edge 146, third upper edge 148, and forth upper edge 150. Case assembly 130 has a base portion 132 forming a floor for supporting a device placed therein. Assembly 130 is contemplated as customizable having one or more cavities for accessing a device nested therein. By way of example, first access cavity 137, second access cavity 139, and third access cavity 142. Additionally contemplated is a lens cavity 133 constructed and arranged to provide access to and image capture lens of a device nested with in case assembly 130. In one nonlimiting example, device 160 is nested in case assembly 130 as shown in the accompanying figures.

In use, assembly 10 is contemplated to have a user remove case assembly 130 position a device on to case assembly base 132 open access door assembly 50 slide case assembly 130 into housing assembly 10 through receiving cavity 46 until case assembly 130 is fully nested within the interior of housing assembly 20. A user will close access door assembly 57 and secure device 160 within housing assembly 20. Housing assembly 20 has connected thereto support base 92. The user will secure mounting assembly 90 on to a handlebar HB by positioning the handlebar with in the interior portion of mounting base 106 and securing mounting base 106 into position by tightening mounting screw 118 into mounting screw 110, each positioned on opposing outer portions of first end 108 and second end 112 as demonstrated in the figures.

Once device 160 is securely positioned within assembly 10 a user can activate a video capture feature and by virtue of the assembled components of the present invention mirror 80 will provide images to a video capture apparatus incorporated with device 160. In doing so, a user can securely carry device 160 on a handlebar assembly 10 of the present invention and capture video while operating a bicycle or other device utilizing handlebars.

As generally understood, certain embodiments provide for assembly 10 to have desired features including, but not limited to, any combination of waterproof, water resistant, shockproof, shock resistant, impact proof, impact resistant, and the like.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An electronic device mount, comprising:
   A) a housing assembly comprising a top face, a bottom face, a lateral face, and a first edge to define an interior cavity bordered by first, second, third, and fourth interior edges, a transparent film screen is positioned within a periphery of said first, second, third, and fourth interior edges that simultaneously protects a device placed within said housing assembly and provides for viewing of a device screen, said housing assembly further comprises an actuator extending button positioned at said top face that is arranged to interact with a device actuator when said device is positioned within said housing assembly, said housing assembly further comprises a receiving cavity defined by said first edge, and a first lens cavity defined at said bottom face, said housing assembly further comprises an access door assembly having door arms arranged to interact with respective door arm receivers, whereby said access door assembly is pivotably connected to said housing assembly at a pivot assembly, said access door assembly comprises a door cavity and a door edge, said housing assembly further comprises a mirror housing assembly defined by first and second side portions, and a bottom portion, said first and second side portions are parallel to one another and parallel to said access door assembly, said mirror housing assembly comprises a mirror therein, a position of said mirror is either angular, curved, or combinations thereof relative to said bottom face of said housing assembly, said mirror housing assembly further comprises a lens positioned on or proximate to said mirror;
   B) a case assembly comprising first, second, third, and fourth walls that terminate at respective first, second, third, and fourth upper edges, said case assembly further comprises a base portion forming a floor for supporting said device placed therein, said case assembly further comprises a second lens cavity arranged to provide access to an image capture lens of said device nested within said case assembly, said door cavity is arranged to contain at least a portion of said case assembly when said case assembly is positioned within said housing assembly, said second lens cavity constructed and arranged to provide a light pathway to said image capture lens of said device, whereby said light pathway includes a pathway of light and or images direct in from said mirror housing assembly, whereby light passes into said mirror housing assembly and is reflected onto said mirror and reflected light is propagated through said first and second lens cavities and captured by said device positioned and contained within housing assembly; and
   C) a mounting assembly comprising a first mounting base, a support, and a support mount, said support provides swivel movement for said first mounting base, said mounting assembly further comprises a support arm having a curved portion connected to a second mounting base by a mounting assembly hinge, said second mounting base comprises an internal mounting base support, said mounting assembly further comprises a pair of screw receiving cavities arranged in opposition one to another, said mounting assembly further comprises a reinforcing support brace that provides structural support to said support arm by providing a structure in contact between said support arm and said second mounting base, and said mounting base comprises first and second ends.

2. The electronic device mount set forth in claim 1, whereby said case assembly comprises first, second, and third access cavities.

3. The electronic device mount set forth in claim 1, whereby said pair of screw receiving cavities provide for insertion of a screw therethrough, whereby said screw will contact a screw securing nut when said screw is tightened by a rotational attachment imparted by rotating a screw head.

4. The electronic device mount set forth in claim 1, whereby said device is a camera, cell phone, smart phone, tablet computer, or electronic article including at least one image capture element.

* * * * *